United States Patent
DeRoy

(10) Patent No.: US 10,144,521 B2
(45) Date of Patent: Dec. 4, 2018

(54) ELECTRIC COMPRESSOR FOR USE WITH A WING ANTI-ICE SYSTEM

(71) Applicant: HAMILTON SUNDSTRAND CORPORATION, Windsor Locks, CT (US)

(72) Inventor: Robert M. DeRoy, Tolland, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 21 days.

(21) Appl. No.: 14/817,678

(22) Filed: Aug. 4, 2015

(65) Prior Publication Data

US 2017/0036770 A1 Feb. 9, 2017

(51) Int. Cl.
*B64D 15/04* (2006.01)
*B64D 13/06* (2006.01)

(52) U.S. Cl.
CPC .............. *B64D 15/04* (2013.01); *B64D 13/06* (2013.01); *B64D 2013/0607* (2013.01); *B64D 2013/0644* (2013.01); *Y02T 50/56* (2013.01)

(58) Field of Classification Search
CPC ......... B64C 15/04; B64C 15/02; B64C 15/12; B64D 13/06; B64D 2013/0607; B64D 2013/0644
See application file for complete search history.

(56) References Cited

U.S. PATENT DOCUMENTS

| | | | |
|---|---|---|---|
| 4,503,666 A * | 3/1985 | Christoff | B64D 13/06 60/39.183 |
| 4,976,397 A | 12/1990 | Rudolph et al. | |
| 5,114,100 A * | 5/1992 | Rudolph | B64C 21/06 244/130 |
| 5,114,103 A * | 5/1992 | Coffinberry | B64C 21/06 244/118.5 |
| 6,194,685 B1 * | 2/2001 | Rutherford | B64D 15/14 219/201 |
| 6,629,428 B1 | 10/2003 | Murry | |
| 6,704,625 B2 | 3/2004 | Albero et al. | |
| 7,322,202 B2 * | 1/2008 | Zywiak | B64D 13/06 62/401 |
| 7,607,318 B2 * | 10/2009 | Lui | B64D 13/06 244/118.5 |
| 7,797,962 B2 | 9/2010 | Kresser et al. | |
| 7,950,606 B2 | 5/2011 | Atkey et al. | |

(Continued)

FOREIGN PATENT DOCUMENTS

| EP | 0436243 A2 | 12/1990 | |
| EP | 2557038 A2 * | 2/2013 | ............ B64D 13/06 |

(Continued)

OTHER PUBLICATIONS

EP SR, Issued Dec. 20, 2016.

*Primary Examiner* — Assres H Woldemaryam
(74) *Attorney, Agent, or Firm* — Cantor Colburn LLP

(57) ABSTRACT

A method and system providing an airflow to a wing anti-ice system includes receiving an airflow from an outside air supply, compressing the airflow via an electric compressor, controlling a temperature of the airflow from the electric air compressor via a heat exchanger in fluid communication with the electric compressor and the wing anti-ice system, and providing the airflow to the wing anti-ice system via the heat exchanger.

7 Claims, 2 Drawing Sheets

(56) References Cited

U.S. PATENT DOCUMENTS

| | | | |
|---|---|---|---|
| 8,572,996 B2 | 11/2013 | Dittmar et al. | |
| 2002/0179773 A1* | 12/2002 | Breer | B64D 15/04 |
| | | | 244/134 R |
| 2008/0142638 A1* | 6/2008 | Chapman | B64D 15/04 |
| | | | 244/134 R |
| 2011/0131999 A1 | 6/2011 | Gao et al. | |
| 2012/0048509 A1 | 3/2012 | Weber et al. | |
| 2012/0216545 A1* | 8/2012 | Sennoun | B64D 13/06 |
| | | | 60/772 |
| 2013/0040545 A1* | 2/2013 | Finney | B64D 13/06 |
| | | | 454/71 |
| 2013/0187007 A1* | 7/2013 | Mackin | F02C 6/08 |
| | | | 244/134 R |
| 2013/0318983 A1* | 12/2013 | Zhou | F02C 6/08 |
| | | | 60/772 |
| 2014/0369812 A1* | 12/2014 | Caruel | F02K 3/06 |
| | | | 415/116 |
| 2015/0151847 A1 | 6/2015 | Krug et al. | |
| 2015/0183291 A1* | 7/2015 | Higuchi | B60H 1/00785 |
| | | | 62/133 |

FOREIGN PATENT DOCUMENTS

| | | | |
|---|---|---|---|
| EP | 2557038 A2 | 2/2013 | |
| FR | 2829466 A1 | 3/2003 | |
| GB | 2499578 A | 8/2013 | |

* cited by examiner

ELECTRIC COMPRESSOR FOR USE WITH A WING ANTI-ICE SYSTEM

BACKGROUND

The subject matter disclosed herein relates to wing anti-ice systems, and more particularly, to a system and a method for providing an electric compressor for use with a wing anti-ice system for an aircraft.

Typically, bleed air from an aircraft engine is utilized to provide an airflow required for wing anti-ice systems. Certain aircraft configurations may not provide bleed air for secondary systems such as wing anti-ice systems. The use of wing anti-ice systems with aircrafts that do not provide bleed air to wing anti-ice systems is desired.

BRIEF SUMMARY

According to an embodiment, a system to provide an airflow to a wing anti-ice system includes an electric compressor to compress the airflow from an outside air supply, and a heat exchanger in fluid communication with the electric compressor and the wing anti-ice system, to control a temperature of the airflow from the electric compressor.

According to an embodiment, a method to provide an airflow to a wing anti-ice system includes receiving an airflow from an outside air supply, compressing the airflow via an electric compressor, controlling a temperature of the airflow from the electric air compressor via a heat exchanger in fluid communication with the electric compressor and the wing anti-ice system, and providing the airflow to the wing anti-ice system via the heat exchanger.

According to an embodiment, a wing anti-ice system includes a plurality of piccolo tubes, and a system to provide an airflow to the plurality of piccolo tubes, including an electric compressor to compress the airflow from an outside air supply, and a heat exchanger in fluid communication with the electric compressor and the wing anti-ice system, to control a temperature of the airflow from the electric compressor.

Technical function of the embodiments described above includes an electric compressor to compress the airflow from an outside air supply, and a heat exchanger in fluid communication with the electric compressor and the wing anti-ice system, to control a temperature of the airflow from the electric compressor.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
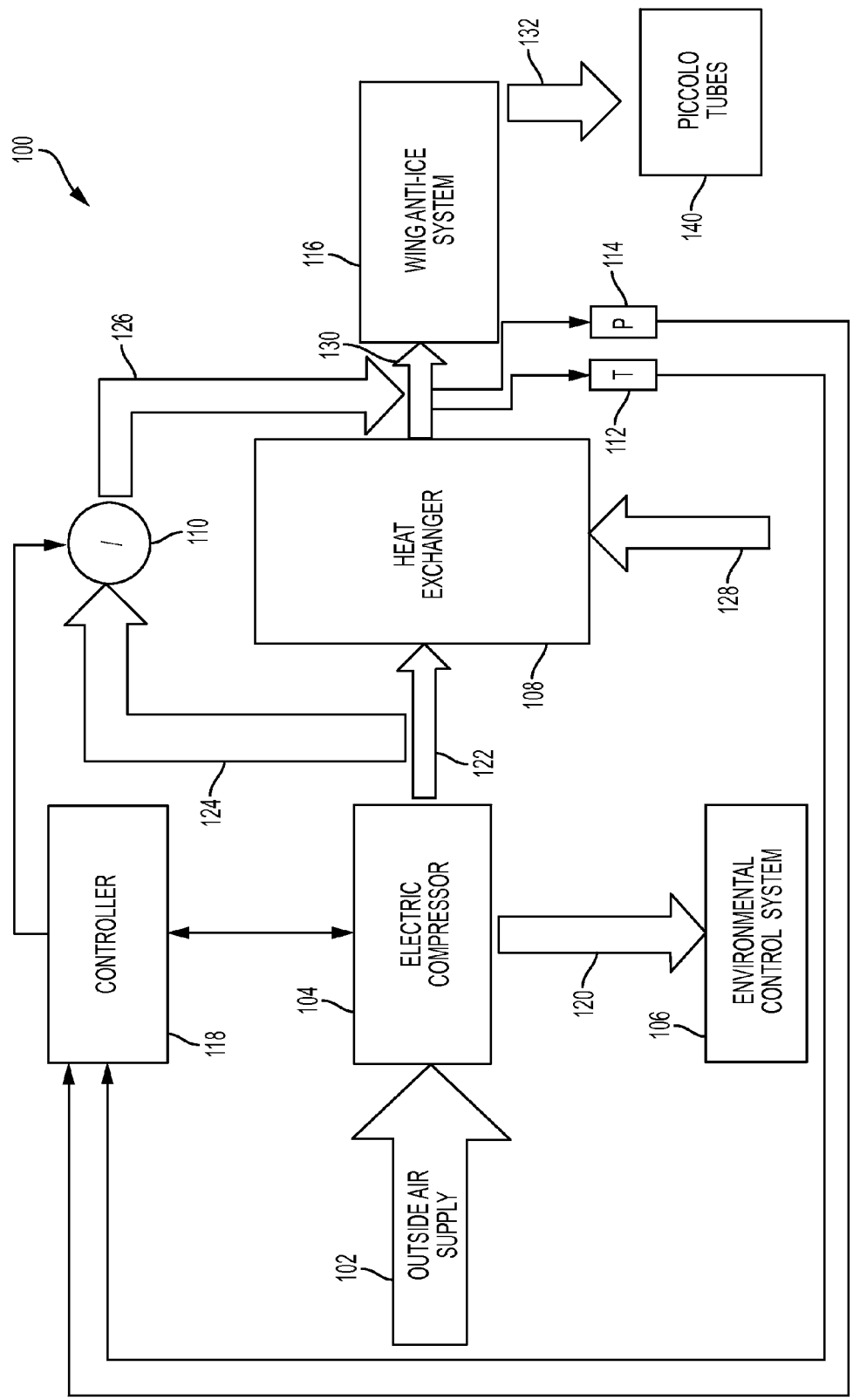
FIG. 1 is a schematic view of one embodiment of an electric compressor system for use with a wing anti-ice system.

Referring now to the drawings, FIG. 1 shows an electric compressor system 100. In the illustrated embodiment, the electric compressor system 100 includes an electric compressor 104, a heat exchanger 108, a bypass valve 110, and a controller 118. The electric compressor system 100 can be utilized with conventional wing anti-ice systems 116 that typically utilize bleed air from an aircraft engine. Advantageously, the electric compressor system 100 can provide an airflow for wing anti-ice systems 116 that require a supplied airflow when used with aircraft not configured to provide bleed air to secondary systems such as the wing anti-ice system 116.

In the illustrated embodiment, the electric compressor 104 can provide pressurized and heated air to the wing anti-ice system 116. In the illustrated embodiment, the electric compressor 104 can be any suitable compressor to provide a desired airflow. During operation, the electric compressor 104 can receive an outside air supply 102 and provide a pressurized airflow output 122 and 124 to a heat exchanger 108 and a bypass valve 110 respectively. Airflows 122 and 124 may be heated due to compression provided by the electric compressor 104. Advantageously, the electric compressor 104 can provide enhanced control over the output airflows 122 and 124. In the illustrated embodiment, a controller 118 can selectively engage, disengage, and adjust the output of the electric compressor 104. Accordingly, the output from the electric compressor 104 is not tied to an engine speed and can therefore supply a desired output airflow 122 and 124 as required, allowing for increased system efficiency.

In certain embodiments, the electric compressor 104 can be configured to provide additional airflow 120 to an environmental control system 106. In certain embodiments, the environmental control system 106 can provide airflow within the cabin of an airplane. Accordingly, the use of the electric compressor 104 allows for on demand airflow to the cabin of an aircraft without using aircraft bleed air and without having an additional compressor.

In the illustrated embodiment, a heat exchanger 108 can receive the compressed airflow 122 from the electric compressor 104 that has been heated during compression and remove heat from the airflow 122 to a reference temperature that meets the wing anti-ice system 116 thermal performance requirement. The heat exchanger 108 can receive cool side airflow 128 to remove heat from the airflow 122. After the airflow passes through the heat exchanger 108, the cooled airflow 130 is sent to the wing anti-ice system 116. In certain embodiments, the heat exchanger 108 can be any suitable heat exchanger.

In the illustrated embodiment, a bypass valve 110 can provide a bypass path 126 for the air from the electric compressor 104 to bypass the heat exchanger 108 to limit the cooling of the airflow 130. In conjunction with the controller 118, the bypass valve 110 can control flow through bypass path 126 to the airflow 130 and wing anti-ice system 116 to control the temperature of the airflow 130. During operation, the bypass valve 110 can be fully open, fully closed, or modulated to provide the desired flow through the bypass path 126. Accordingly, the bypass valve 110 can be controlled via the controller 118 to provide a target temperature of the airflow 130, as measured by the temperature sensor 112, suitable for the wing anti-ice system 116.

In the illustrated embodiment, a controller 118 can control operation of the electric compressor system 100. In certain embodiments, the controller 118 can control the pressure of the airflow 130 received by the wing anti-ice system 116. In the illustrated embodiment, a controller 118 can provide power to the electric compressor 104. Additionally, the controller 118 can control the speed of the electric compressor 104 to obtain a desired airflow 122 temperature and pressure. As shown in FIG. 1, the electric compressor system 100 includes a pressure sensor 114 to determine a pressure received by the wing anti-ice system 116. During operation, the controller 118 can compare the pressure sensor 114 reading with a target pressure to determine if the airflow 130 pressure is above, below, at a target pressure reading. If a pressure reading exceeds a target pressure, the controller 118 can vary the speed of the electric compressor 104 until the airflow 130 pressure is below the target pressure. In certain embodiments, the speed control of the electric compressor 104 can be executed by algorithms in the control logic of the controller 118. Similarly, the controller 118 can increase output or engage the electric compressor 104 if the airflow 130 pressure is below a target pressure. In certain embodiments, the controller 118 can cycle the operation of the electric compressor 104 to achieve a desired output.

In certain embodiments, the controller 118 can control the temperature of the airflow 130 received by the wing anti-ice system 116. As shown in FIG. 1, the electric compressor system 100 includes a temperature sensor 112 to determine a temperature of the airflow 130 received by the wing anti-ice system 116. During operation, the controller 118 can compare the temperature sensor 112 reading with a target temperature to determine if the airflow 130 temperature is above, below, or at a target temperature reading. If the temperature reading exceeds a target temperature, the controller 118 can partially or completely close the bypass valve 110 to direct additional airflow 122 into the heat exchanger 108 to reduce the airflow 130 temperature. Similarly, the controller 118 can partially or completely open the bypass valve 110 to direct additional airflow 122 through bypass path 126 to the wing anti-ice system 116 to increase the airflow 130 temperature. In certain embodiments, the controller 118 can cycle the operation of the bypass valve 110 to achieve a desired airflow 130 temperature. In certain embodiments, the controller 118 can adjust the speed of the compressor 104 to control the temperature of the airflow 122 and 124.

In other embodiments, the controller 118 can control the electric compressor 104, the bypass valve 110, and receive inputs from the temperature sensor 112 and the pressure sensor 114 to control other aspects of the electric compressor system 100. In certain embodiments, the controller 118 can modulate bypass flow to control wing anti-ice system 116 temperatures based on sensors within the wing-anti-ice system 116.

In the illustrated embodiment, the wing anti-ice system 116 is utilized to prevent the accumulation of ice on the wings of an aircraft. Typically, the wing anti-ice system 116 utilizes bleed air from the aircraft engine, transferred via pneumatic tubing to the wing anti-ice system 116. However, certain aircraft configurations do not provide bleed air to secondary systems. Accordingly, the use of the electric compressor system 100 allows for conventional wing anti-ice systems 116 to be utilized. In the illustrated embodiment, the wing anti-ice system 116 can distribute an airflow 130 received from the electric compressor system 100 via a manifold. As described above, the airflow 130 may be pressure and temperature controlled to provide desirable performance of the wing anti-ice system 116. During operation, the airflow 132 is then distributed to the piccolo tubes 140. In certain embodiments, the piccolo tubes 140 are disposed in any suitable location, such as around the leading edge of wings to provide airflow to melt or displace any ice on the wings of the aircraft.

Figure 2:
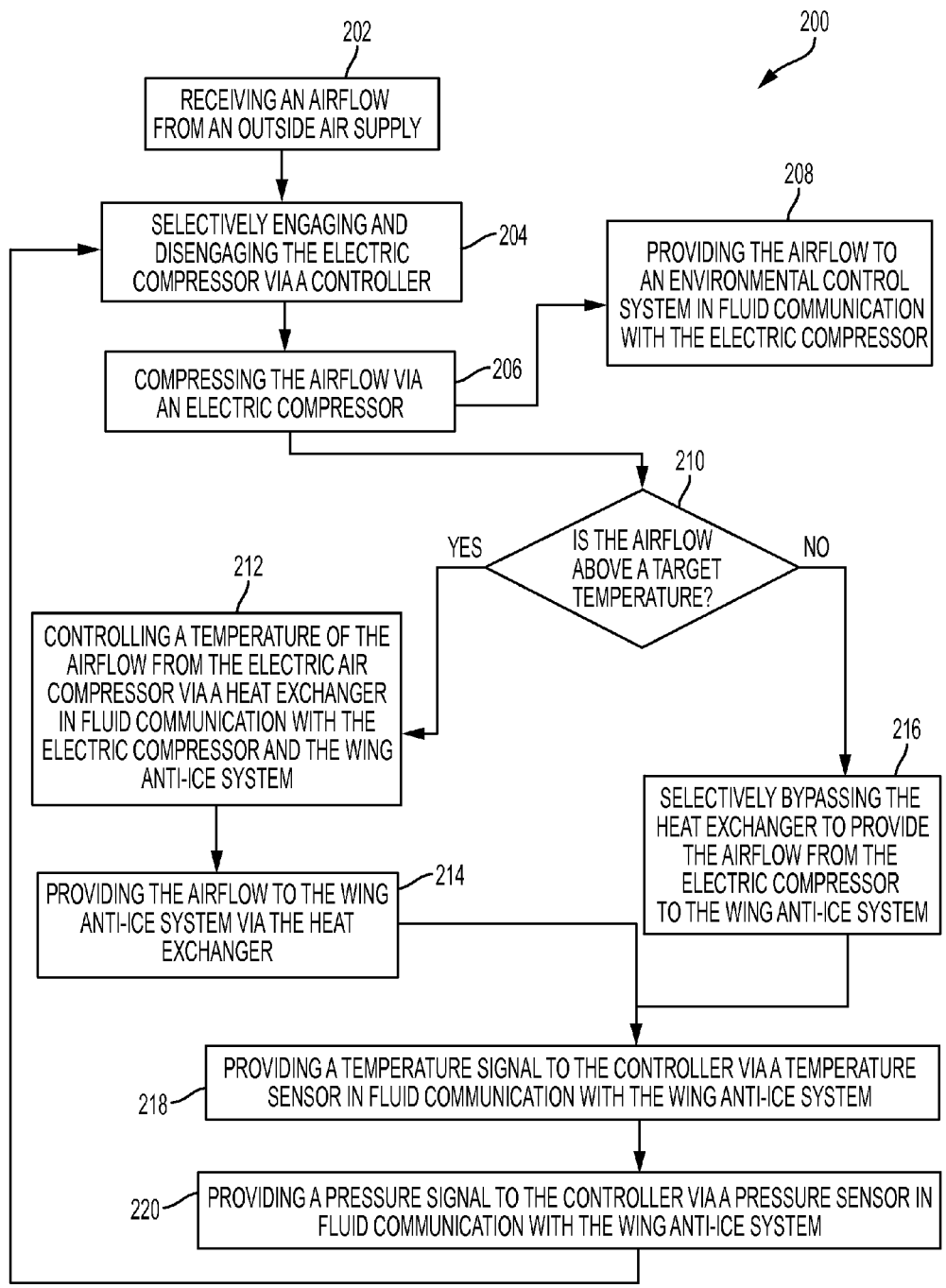
FIG. 2 is a flow chart of one embodiment of a method to provide an airflow for a wing anti-ice system.

Referring to FIG. 2, a method 200 for providing an airflow to a wing anti-ice system is shown. In operation 202, an airflow is received from an outside air supply. In operation 204, the electric compressor is selectively engaged and disengaged via a controller. Advantageously, the electric compressor can provide enhanced control over the output airflows. In certain embodiments, a controller can selectively engage, disengage, and adjust the output of the electric compressor in response to temperature and pressure readings.

In operation 206, the airflow is compressed via an electric compressor. In certain embodiments, the controller can control the pressure of the airflow received by the wing anti-ice system. During operation, the controller can compare the pressure sensor reading with a target pressure to determine if the airflow pressure is above, below, at a target pressure reading and adjust the electric compressor operation accordingly.

In operation 208, the airflow is provided to an environmental control system in fluid communication with the electric compressor. In certain embodiments, the environmental control system can provide airflow within the cabin of an airplane.

In operation 210, the controller determines if the airflow to the wing anti-ice system is above a target temperature. If the temperature of the airflow is at or above the target temperature, operation 212 is performed. If the temperature of the airflow is below the target temperature, operation 216 is performed.

In operation 212, a temperature of the airflow from the electric air compressor is controlled via a heat exchanger in fluid communication with the electric compressor and the wing anti-ice system. The heat exchanger can receive a cool side airflow to remove heat from the airflow.

In operation 214, the airflow is provided to the wing anti-ice system via the heat exchanger.

In operation 216, the heat exchanger is selectively bypassed to provide the airflow from the electric compressor to the wing anti-ice system. In the illustrated embodiment, a bypass valve can provide a bypass path for the air from the electric compressor to bypass the heat exchanger to limit the cooling of the airflow through the bypass path. During operation, the controller can compare the temperature sensor reading with a target temperature to determine if the airflow temperature is above, below, or at a target temperature reading and adjust the bypass valve accordingly.

In operation 218, a temperature signal is provided to the controller via a temperature sensor in fluid communication with the wing anti-ice system. During operation, the controller can compare the temperature sensor reading with a target temperature to determine if the airflow temperature is above, below, or at a target temperature reading.

In operation 220, a pressure signal is provided to the controller via a pressure sensor in fluid communication with the wing anti-ice system. During operation, the controller can continue to monitor the temperature and pressure sensors and continue to selectively engage and disengage the electric compressor and selectively bypass the heat exchanger, as described in operation 204.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An aircraft wing anti-ice system, comprising:
   a plurality of piccolo tubes; and
   a system to provide an airflow to the plurality of piccolo tubes, comprising:
     an electric compressor to compress the airflow from an ambient outside air supply, wherein the ambient outside air supply does not comprise bleed air from an aircraft engine; and
     a heat exchanger in fluid communication with the electric compressor and the wing anti-ice system, to control a temperature of the airflow from the electric compressor.

2. The system of claim 1, further comprising a bypass valve in fluid communication with the electric compressor and the wing anti-ice system, to selectively bypass the heat exchanger.

3. The system of claim 1, further comprising a controller to selectively engage and disengage the electric compressor.

4. The system of claim 3, further comprising a temperature sensor in fluid communication with the wing anti-ice system to provide a temperature signal to the controller.

5. The system of claim 3, further comprising a pressure sensor in fluid communication with the wing anti-ice system to provide a pressure signal to the controller.

6. The system of claim 1, wherein the electric compressor is in fluid communication with an environmental control system.

7. The method of claim 1, wherein the electric compressor is selectively engagable, disengageable, or adjustable during operation of the system in response to a signal from a sensor in fluid communication with the wing anti-ice system.

* * * * *